Figure 1:
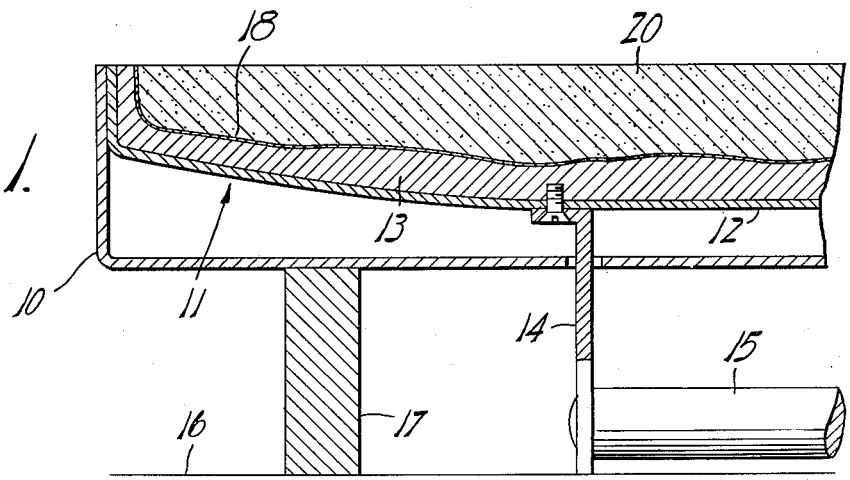

Aug. 18, 1953  J. H. REICHERD  2,648,887
METHOD AND APPARATUS FOR APPLYING WALL FINISHES
Filed Sept. 1, 1950

INVENTOR.
Jerome H Reicherd
BY
Bean, Brooks, Buckley v Bean.
ATTORNEYS

Patented Aug. 18, 1953

2,648,887

UNITED STATES PATENT OFFICE 2,648,887

METHOD AND APPARATUS FOR APPLYING WALL FINISHES

Jerome H. Reicherd, Lockport, N. Y.

Application September 1, 1950, Serial No. 182,728

6 Claims. (Cl. 25—1)

This invention relates to building construction and particularly to a novel method and apparatus for applying building siding in the form of a cementitious coating or layer which simulates natural stone.

A fairly common exterior surface treatment for buildings comprises applying to a building surface a cementitious mix of Portland cement and certain aggregates in a plastic condition, the surface of the deposited material being shaped and colored to simulate natural stone block construction. In some instances the appearance of stone is attained more or less manually after the plastic layer is applied to the building surface but before it has set.

In another widely practiced prior art method the plastic cement is placed in one of a number of variously shaped relatively flat molds of different sizes and the material is ejected from such molds while still in a plastic condition and deposited against a building surface. This building surface is usually a previously applied and set continuous cementitious layer which is generally referred to as a scratch coat or ground coat.

One problem that presents itself in any of the foregoing prior art methods is that of producing a stone simulating wall surface wherein the mortar lines between the several blocks are natural in appearance and uniform in shape and color. Further, unless the color of the mortar line contrasts suitably with the colors of the various stone simulating formations, the general effect is lacking in attractiveness.

The present invention provides a novel mold arrangement and a novel procedure whereby the plastic material which is deposited against the ground coat from the mold actually comprises multiple layers of plastic materials of different colors, the color which is directly against the ground coat being the desired color of the mortar joint or mortar line of the completed siding and the other layer of plastic material, preferably slightly smaller in area than the first layer, being in each instance of the color of the stone simulating element which is being applied to the building wall.

After the mold has been properly prepared, the plastic mix therein is applied to the building wall in one operation so that both layers of plastic material are simultaneously applied to the ground coat of the building siding, one layer or coat directly thereagainst and the second layer or coat overlying the first.

The accompanying drawing illustrates a single form of a suitable mold for accomplishing the purposes of the present invention and the ensuing specification describes such mold and a preferred method or procedure for employing the same by way of example only. It is to be understood that numerous modifications in the mold and in the details of the procedure in using the mold may be effected without departing from the principles of the invention which are limited only as defined in the appended claims.

Figure 2:
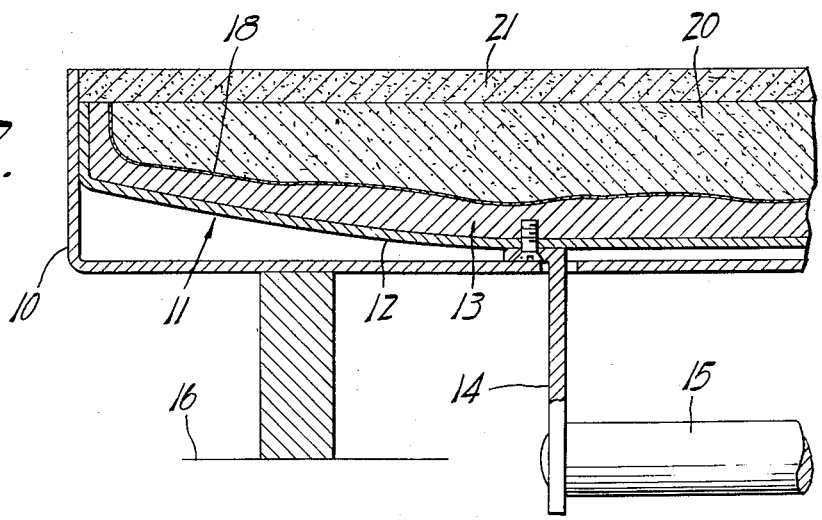

In the drawing:

Fig. 1 is a longitudinal cross sectional view through one form of the mold of the present invention with the parts thereof in a preliminary position; and, Fig. 2 is a view similar to Fig. 1 but showing the parts of the mold in a more advanced stage of the present method.

In the drawing like characters of reference denote like parts and the numeral 10 designates a casing or shell element in the form of an open rectangular pan. While most of the mold outlines are rectangular or square, other polygonal forms, usually but not necessarily quadrilateral, are generally interspersed as in natural stone walls. The numeral 11 designates an inner mold part which, in the present instance, comprises a metallic shell 12 and a metallic liner 13, the interior face of the latter being a reverse replica of the surface of the stone simulating elements to be formed by the mold.

The mold 11 has extending rigidly from its rear face a pair of spaced brackets 14 which terminate in a handle element 15. The brackets 14 pass freely through suitable slots in shell 10 so that the mold part 11 is free to move inwardly and outwardly of shell 10 within certain limits.

In the first step of the present method the assembled shell and mold 10 and 11 are placed upon a table 16 with the shell 10 resting upon a pair of spaced rails or blocks 17 which may be secured to the upper surface of the table. The height of the rails or blocks 17 is such that the brackets 14 of the handle structure of mold 11 rest upon the table 16 as shown in Fig. 1 with the mold part 11 raised partly out of shell 10 to a point where the outer edges of mold 11 and shell 10 are in substantially the same horizontal plane.

With the parts in this position the mold is first lined with a sheet of wax paper or the like as at 18, this being a conventional expedient in this art to facilitate separation of the plastic material when the mold is withdrawn. The interior of mold 11 is then filled with plastic material in the form of hydrated cement and aggregate as indicated at 20. Any weather resistant settable material or mixture suitable for the general purpose of forming a molded building siding may be employed. This much of the plastic material is of the color which the stone simulating portion of the applied material is desired to have.

The colors of the layers 20 in successive mold applications may be uniform or, as is more common, may vary in successive molds. It is a simple matter to rake across the tops of the shell 10 and the mold 11 in the position of Fig. 1 to impart a level upper surface to layer 20.

The shell and mold are then removed from the table 16 so that handle 15 and brackets 14 drop downwardly and mold 11 drops into shell 10 to its full extent, which in the present instance is determined by the flanged ends of brackets 14 striking the bottom interior surface of shell 10, as shown in Fig. 2. This step of the method may be facilitated by merely arranging the pair of rails 17 so that they extend forwardly beyond the front edge of table 16. Thus, the shell 10 may merely be slid along the rails toward the operator until handle 15 and handle brackets 14 leave the surface of the table 16 and drop to the position shown in Fig. 2.

The space above the layer of material 20 which has already been deposited in mold 11 is then filled with plastic material of the same general nature but of a contrasting color, up to the top edge of shell 10 as indicated at 21 in Fig. 2. It will be noted that layer 21 extends laterally beyond layer 20 about its entire circumference.

The ensuing procedure in applying the two layer plastic mix to a set ground coat on a building wall from this point onward is the same as in prior art methods such as that shown for instance in Miller Patent No. 1,888,234 dated November 22, 1932. In applying the contents of the mold to a building wall the material of outer layer 20 may to some extent merge with or overlie the edge portions of layer 21 to partially conceal or obscure the latter. In such a case the end of a scraping tool of suitable width may be drawn along the lines between adjacent mold deposits to produce clear and distinct mortar-joint simulating lines between adjacent stone simulating deposits.

What is claimed is:

1. The method of applying a surface finish to simulate stone or the like which comprises depositing a layer of plastic stone-simulating cementitious material upon a molding surface, depositing a second layer of mortar-simulating cementitious material of greater area on the first layer whereby the second layer projects marginally beyond the first layer, and then jointly applying said layers against a building surface in such manner as to expose the marginal portions of the second layer to simulate mortar-joint lines.

2. The method of applying a surface finish to simulate stone or the like which comprises depositing a layer of plastic stone-simulating cementitious material upon a molding surface, depositing a second layer of mortar-simulating cementitious material on the first layer with the edges of the second layer projecting beyond the edges of the first layer, and then jointly applying said layers against a building surface so that the projecting portions of the second layer simulate mortar joints between the stone-simulating material deposits.

3. The method of applying a surface finish to simulate stone or the like which comprises depositing a layer of plastic stone-simulating cementitious material in a mold, depositing a second layer of mortar-simulating cementitious material on the first layer with the edges of the second layer projecting beyond the edges of the first layer, and then jointly applying said layers against a building surface to expose predetermined portions of the second layer between the deposits of stone-simulating material to simulate mortar-joint lines.

4. In apparatus for molding and applying multiple layers of plastic material of different colors to a building surface to simulate stone or the like, an element comprising a relatively shallow stone-simulating mold, a casing for receiving said molding element comprising a bottom wall and side walls of substantially greater depth than said mold, whereby said mold may be moved into said casing with its outer marginal edges substantially below the plane of the outer edges of the side walls of said casing, and means for preliminarily supporting said casing and said mold with the marginal edges of the latter exposed with respect to the casing side walls to permit leveling off a preliminary layer of plastic material in said mold.

5. In apparatus for molding and applying multiple layers of plastic material of different colors to a building surface to simulate stone or the like, an element comprising a stone-simulating molding surface having a flat marginal ledge thereabout, a casing for receiving said molding element comprising a bottom wall and side walls of substantially greater depth than said molding element, whereby said molding element may be moved into said casing with the marginal ledges thereof substantially below the plane of the outer edges of the side walls of said casing, and means for preliminarily supporting said casing and said molding element with the marginal ledges of the latter exposed with respect to the casing side walls to permit leveling off a preliminary layer of plastic material in said molding element to the level of said ledges.

6. In apparatus for molding and for simultaneously applying multiple layers of plastic material to a building surface to simulate stone or the like, an element comprising a stone-simulating mold, a casing for receiving said mold comprising a bottom wall and side walls of greater depth than said mold, whereby said mold may be moved into said casing with its outer marginal edges below the plane of the outer edges of the side walls of said casing, said molding element being movable to expose its outer marginal edges with respect to the casing side walls to permit leveling off a preliminary layer of plastic material in said molding element, and the overall depth of said mold being less than the interior depth of said casing by an amount equal to the predetermined thickness of a second layer of plastic material.

JEROME H. REICHERD.

References Cited in the file of this patent

UNITED STATES PATENTS

| Number | Name | Date |
| --- | --- | --- |
| 958,997 | Dunton | May 24, 1910 |
| 1,194,554 | Seiler | Aug. 15, 1916 |
| 1,583,748 | Lorenzen | May 4, 1926 |
| 1,888,234 | Miller | Nov. 22, 1932 |